(12) United States Patent
Bai et al.

(10) Patent No.: US 11,453,814 B2
(45) Date of Patent: Sep. 27, 2022

(54) PRESSURE-BEARING PLUGGING AGENT AND PREPARATION METHOD AND USE THEREOF

(71) Applicant: Southwest Petroleum University, Chengdu (CN)

(72) Inventors: Yang Bai, Chengdu (CN); Lingfeng Wu, Chengdu (CN); Pingya Luo, Chengdu (CN); Haibo Liang, Chengdu (CN); Wen Xu, Chengdu (CN); Wenzhe Li, Chengdu (CN); Feng Dai, Chengdu (CN); Guancheng Jiang, Chengdu (CN); Gang Xie, Chengdu (CN); Jiading Deng, Chengdu (CN)

(73) Assignee: Southwest Petroleum University, Chengdu (CN)

(*) Notice: Subject to any disclaimer, the term of this patent is extended or adjusted under 35 U.S.C. 154(b) by 0 days.

(21) Appl. No.: 17/505,365

(22) Filed: Oct. 19, 2021

(65) Prior Publication Data
US 2022/0267662 A1    Aug. 25, 2022

(30) Foreign Application Priority Data

Feb. 22, 2021 (CN) .......................... 202110198747.2

(51) Int. Cl.
C09K 8/68 (2006.01)
C09K 8/42 (2006.01)

(52) U.S. Cl.
CPC .................................... *C09K 8/426* (2013.01)

(58) Field of Classification Search
CPC ..................................................... C09K 8/426
See application file for complete search history.

(56) References Cited

U.S. PATENT DOCUMENTS

| | | | |
|---|---|---|---|
| 2005/0194135 A1* | 9/2005 | Nguyen | C09K 8/508 166/276 |
| 2018/0149008 A1* | 5/2018 | Nguyen | E21B 43/267 |
| 2018/0371309 A1* | 12/2018 | Chan | C09K 8/62 |

* cited by examiner

*Primary Examiner* — Alicia Bland
(74) *Attorney, Agent, or Firm* — Calfee Halter & Griswold LLP

(57) ABSTRACT

The present disclosure a pressure-bearing plugging agent, comprises a core, a first coating layer and a second coating layer which are sequentially coated on an outer surface of the core, wherein the core is made of a water-absorbing swellable material, the first coating layer is a paraffin layer, and the second coating layer is obtained by cementing the rigid particles with an adhesive.

12 Claims, No Drawings

PRESSURE-BEARING PLUGGING AGENT AND PREPARATION METHOD AND USE THEREOF

PRIORITY CLAIM & CROSS REFERENCE

The application claims priority to Chinese Application No. 202110198747.2, filed on Feb. 22, 2021, entitled "Pressure-bearing plugging agent and preparation method and use thereof", which is herein specifically and entirely incorporated by reference.

FIELD

The present disclosure relates to the technical field of plugging with regard to drilling fluid, in particular to a pressure-bearing plugging agent, a preparation method and a use thereof.

BACKGROUND

The reason for causing leakage and loss during the well-drilling construction resides in the development of the cracks in the stratum, the bottom of the stratum has natural cracks, which are composed of vertical cracks and horizontal cracks, and are mainly consisting of the vertical cracks, and the vertical cracks are extremely developed. The leakage and loss are accompanied with an existence of the cracks, where there are cracks, there are leakage and loss, such that the stratum has a low pressure-bearing capacity.

In order to solve the problem concerning a low pressure-bearing capacity of the stratum, the conventional bridging and plugging technologies are frequently used at present, the mechanism of the technologies is that a plurality of bridging plugging materials are compounded into a plugging slurry, which is squeezed by a high pressure into the leakage sites of the stratum, the bridging plugging materials form a filling plugging layer at the shallow part and the surface of the crack, the formed filling plugging layer cannot be easily pushed away because it generates a large friction with the wall surface of the crack or aperture, the dense filling plugging layer fulfills the purposes of plugging the apertures, eliminating leakage and loss, and improving pressure-bearing capacity of the stratum.

However, the aforementioned mean merely form a filling plugging layer at the shallow part and the surface of the crack to separate the interior space of the crack from the wellbore, given that there is a pressure difference between the internal space of the crack and the stratum, the stratum stress may generate an extrusion force on the crack, the new secondary cracks can be formed on the wall of the crack under the action of the extrusion force, the formation of the secondary cracks will further expand the internal space of the crack, and the stratum stress is transmitted into the interior space of the crack after expansion of the internal space of the crack, in the meanwhile, the pressure difference between the wellbore and the internal space of the crack is increased, that is, the pressure difference at two sides of the filling plugging layer is increased, the filling plugging layer is prone to fall off or break down under the action of the increasing pressure difference, so that the leakage reappears, causing the vicious cycle, namely "leakage after the plugging operation, and further plugging is required after the leakage".

Therefore, the research and development of a pressure-bearing plugging agent have an important significance.

SUMMARY

The present disclosure aims to overcome the problems of low pressure-bearing capacity of stratum in the prior art, and the defects that the pressure-bearing plugging agent has a poor plugging effect and is prone to break down in the secondary crack development stratum in the prior art, and provides a pressure-bearing plugging agent, a preparation method and a use thereof.

In order to achieve the above objects, a first aspect of the present disclosure provides a pressure-bearing plugging agent, wherein the pressure-bearing plugging agent comprises a core, a first coating layer and a second coating layer which are sequentially coated on an outer surface of the core, wherein the core is made of a water-absorbing swellable material, the first coating layer is a paraffin layer, and the second coating layer is obtained by cementing the rigid particles with an adhesive.

A second aspect of the present disclosure provides a method of preparing the pressure-bearing plugging agent, wherein the method comprises the following steps:

(1) subjecting the water-absorbing material to a spheroidization process to obtain a core;

(2) coating at least a part of an outer surface of the core with paraffin to obtain a paraffin layer;

(3) adhering the adhesive and mixed powder to at least a part of an outer surface of the paraffin layer and subjecting to the baking treatment, so as to obtain the modified bridging material, wherein the adhesive and mixed powder comprises rigid particles and an adhesive.

A third aspect of the present disclosure provides a pressure-bearing plugging agent prepared with the aforementioned preparation method.

A fourth aspect of the present disclosure provides a use of the aforementioned pressure-bearing plugging agent in the well-drilling construction operation for the crack development stratum.

Through the above technical scheme, the pressure-bearing plugging agent provided by the present disclosure has the following favorable effects:

The pressure-bearing plugging agent disclosed by the present disclosure is characterized in that the first coating layer, the second coating layer and the core are mutually matched, when the pressure-bearing plugging agent is disposed at the surface and shallow layer of a crack, the pressure-bearing plugging agent can be used as a rigid particle material for bridging and constructing a frame for the subsequent filling and forming a filling plugging layer; when the pressure-bearing plugging agent is disposed in the crack, the coating layer is disintegrated, a water-swelling material used as the core may absorb water and swell, such that the interior space of the crack is effectively and completely filled, the pressure difference between a stratum and the interior space of the crack is eliminated, the occurrence of plugging failure caused by the formation of secondary cracks after the plugging operation is effectively avoided.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point values of the various ranges, and the individual point values may be combined with one another to produce one or more new numerical ranges, which should be deemed have been specifically disclosed herein.

A first aspect of the present disclosure provides a pressure-bearing plugging agent, wherein the pressure-bearing plugging agent comprises a core, a first coating layer and a second coating layer which are sequentially coated on an outer surface of the core, wherein the core is made of a water-absorbing swellable material, the first coating layer is a paraffin layer, and the second coating layer is obtained by cementing the rigid particles with an adhesive.

The inventors of the present disclosure have found that the pressure-bearing plugging agent of the present disclosure plays the bridging and filling roles during the plugging operation, specifically, when the pressure-bearing plugging agent is disposed at the surface and shallow layer of a crack, the pressure-bearing plugging agent can be used as a rigid particle material for bridging and constructing a frame for the subsequent filling and forming a filling plugging layer; when the pressure-bearing plugging agent enters the interior part the crack, a paraffin layer inside the pressure-bearing plugging agent melts due to a high temperature of the stratum crack, a cavity is formed between an outer shell (a second coating layer) and a core, a part of the pressure-bearing plugging agent causes the outer shell to disintegrate inwards under the action of ground stress, the resin sodium polyacrylate particles with high water absorption applied as the core are exposed and contact with external water (including the water in drilling fluid and the stratum water), the water-absorbent resin sodium polyacrylate particles swell and deform after absorbing water, so as to fill the internal space of the crack, and the swelled water-absorbent resin sodium polyacrylate particles coat the silica powder (the second coating layer) of the shell material to form a new mixture, which simultaneously meet the requirements of ductility and strength, the ductility enables the shell material to fill the crack space, the strength enables the shell material not to be easily ruptured and separated, another part of pressure-bearing plugging agent plays a role in bridging rigid particles in the crack because the shell does not disintegrate or does not disintegrate completely, wherein the pressure-bearing plugging agent allows the shell to be partially disintegrated, the external free water enters into the material through the disintegration crack on the shell, so that the water-absorbent resin sodium polyacrylate particles serving as the core swell to play a role of supporting the shell, thereby further enhancing the structural strength of the material as a whole.

According to the present disclosure, the core has a particle size within a range of 0.5-6 mm, the first coating layer has a thickness of 0.1-0.8 mm, the second coating layer has a thickness of 1.5-6 mm; preferably; preferably, the core has a particle size within a range of 0.8-2.3 mm, the paraffin layer has a thickness of 0.3-0.5 mm, the coating layer has a thickness of 1.8-3.2 mm; more preferably, the core has a particle size within a range of 0.8-1.6 mm, the paraffin layer has a thickness of 0.3-0.4 mm, the coating layer has a thickness of 1.8-2.5 mm; further preferably, the core has a particle size within a range of 0.8-1.2 mm, the paraffin layer has a thickness of 0.3-0.35 mm, the coating layer has a thickness of 1.8-2.2 mm. In the present disclosure, the particle size of the core and the thickness of the first and second coating layers are defined within the aforementioned ranges, there is an advantage that the plugging agent can achieve synergistic effects of the core and the coating layers in the crack development stratum.

According to the present disclosure, the pressure-bearing plugging agent has a particle size within a range of 2.1-12.8 mm, preferably 2.9-6 mm, more preferably 2.9-4.5 mm, and further preferably 2.9-3.75 mm.

According to the present disclosure, the water-absorbing swellable material is a resin; preferably, the water-absorbing swellable material is a highly water-absorbent resin sodium polyacrylate AP. The chemical formula of the highly water-absorbent resin sodium polyacrylate AP is $(C_3H_3NaO_2)_n$, and the highly water-absorbent resin sodium polyacrylate AP is obtained through an aqueous solution polymerization by using acrylic acid and esters thereof as raw materials, its solid product is white and granular, odorless, and can be dissolved in sodium hydroxide aqueous solution, and may precipitate in an aqueous solution of calcium hydroxide, magnesium hydroxide, and the like. The particle size of the sodium polyacrylate before the water absorption is within a range of 2-4 mm, and the particle size after the water absorption is increased to 20-40 mm, thus the sodium polyacrylate is a novel functional polymer material and an important chemical product. In the present disclosure, the highly water-absorbent resin sodium polyacrylate AP is in a solid and granular state and is produced by Hebei Yanxing chemical Co., Ltd.

According to the present disclosure, the paraffin is 58° C. fully-refined granular paraffin, the specification is No. 58, the melting point is 58° C., the oil content is 0.5%, and the paraffin is white, odorless and tasteless granular solid at normal temperature, the paraffin refers to a product obtained by taking oil-containing wax as a raw material, subjecting to sweating or solvent deoiling, and then subjecting to carclazyte or hydrogenation refining. The paraffin has high melting point, low oil content, it does not cement, has not sweating and greasiness feeling at normal temperature, and it has desirable water resistance, moisture resistance and electrical insulation property. In the present disclosure, the fully refined paraffin is manufactured by the Fushun Petrochemical Branch Company of the PetroChina Company Limited.

According to the present disclosure, the rigid particles are one or more selected from the group consisting of calcium carbonate, talc, wollastonite and silica; preferably, the rigid particles are silica; more preferably, the rigid particles have a particle size within a range of 0.5-5 mm Wherein the silica is white, granular and analytically pure, it has a melting point of 1,720° C., a Mohs hardness of 7, and a density of 2.6 g/cm³. In the present disclosure, the silica is produced from Donghai County Fucai Mineral Products Co., Ltd.

According to the present disclosure, the adhesive is one or more selected from the group consisting of modified emulsified resin, polyurethane and epoxy resin, and preferably modified emulsified resin. Wherein the modified emulsified resin is self-emulsified epoxy modified acrylic resin, the model is Protec-3380, the modified emulsified resin is dark brown transparent liquid, the viscosity at 25° C. is within a range of 60,000-90,000, and the pH is between 7.5 and 10.0. In the present disclosure, the modified emulsion resin is produced by Beijing Gao Meng New Materials Co., Ltd.

The present disclosure provides a method of preparing the pressure-bearing plugging agent, wherein the method comprises the following steps:

(1) subjecting the water-absorbing material to a spheroidization process to obtain a core;

(2) coating at least a part of an outer surface of the core with paraffin to obtain a paraffin layer;

(3) adhering the adhesive and mixed powder to at least a part of an outer surface of the paraffin layer and subjecting to the baking treatment, so as to obtain the modified bridging material, wherein the adhesive and mixed powder comprises rigid particles and an adhesive.

According to the present disclosure, the particle size of the core, the thickness of the paraffin layer and the coating layer are as previously described, the content will not be repeated here.

According to the present disclosure, the water-absorbing swellable material, the rigid particles and the adhesive are as previously mentioned, the content will not be repeated here.

According to the present disclosure, the conditions of a spheroidization process in the step (1) includes: subjecting to a crushing process by a crusher so as to produce spheres; specifically, the water-absorbing material is crushed into spheres by a crusher, the spheres are then sieved to obtain a core with a desirable particle size.

According to the present disclosure, the coating process in the step (2) comprises: one or more selected from the group consisting of spraying, pouring, brushing, leaching and sprinkling; preferably, pouring is adopted; specifically, melting the paraffin and coating the melted paraffin on at least a part of an outer surface of the core obtained in the step (1). Preferably, the coating rate is 100%.

According to the present disclosure, the rigid particles and the adhesive are blended in the step (3) to obtain the adhesive and mixed powder, the adhesive and mixed powder is adhered to at least a part of an outer surface of the paraffin layer, the adhesive and mixed powder is baked to obtain the pressure-bearing plugging agent. Specifically, uniformly scattering the adhesive and mixed powder consisting of rigid particles and an adhesive on a tray, then placing the spheres of the core coated with paraffin on the outer surface obtained in the step (2) on the tray and rolling to enable the adhesive and mixed powder to be adhered on the surface of the spheres, and then baking the spheres for 4-10 h, preferably 6-8 h, in a baking oven at the temperature of 30-50° C., preferably 40-45° C., wherein the baking serves to solidify the coating layer, the baking temperature shall not be excessively high, and a low-temperature and long-time mode is adopted to prevent the paraffin from being melted.

A third aspect of the present disclosure provides a pressure-bearing plugging agent prepared with the aforementioned preparation method.

A fourth aspect of the present disclosure provides a use of the aforementioned pressure-bearing plugging agent in the well-drilling construction operation for the crack development stratum.

According to the present disclosure, the crack development stratum has a crack width of 0.1-5 mm, more preferably 0.7-4.3 mm.

According to a particularly preferred embodiment of the present disclosure, the method of preparing the pressure-bearing plugging agent comprises the following steps:

(i) subjecting the highly water-absorbent resin sodium polyacrylate AP to a crushing process by a crusher and a spheroidization process to prepare spheres, and then sieving the spheres with a sieve to obtain a core with a diameter of 0.8-1.2 mm;

(ii) pouring the melted fully-refined granular paraffin liquid on the whole outer surface of the spherical core obtained in the step (i) at the temperature of 62° C.;

(iii) Blending silica particles and an adhesive modified emulsified resin, adhering the mixture to the surface of the product obtained in the step (ii), baking and sieving the product to obtain the pressure-bearing plugging agent with a diameter within a range of 2.9-3.75 mm, specifically, uniformly scattering the mixed powder consisting of the silica particles having a particle size of 0.8-1.2 mm and the adhesive modified emulsified resin on a tray, then placing the spherical product obtained in the step (ii) on the tray and rolling the spherical product, so that the mixed powder is adhered to the surface of the spherical product, then baking the spherical product in a baking oven at 40-45° C. for 6-8 h, taking out and sieving the spherical product to obtain particles with a particle size of 2.9-3.75 mm, thus the pressure-bearing plugging agent with the improved stratum pressure-bearing capacity is prepared.

The prepared pressure-bearing plugging agent comprises a core, a first coating layer and a second coating layer which are sequentially coated on an outer surface of the core; wherein the core is made of the highly water-absorbent resin sodium polyacrylate AP, the core has a diameter within a range of 0.8-1.2 mm, the paraffin layer of the first coating layer has a thickness of 0.3-0.35 mm, and the second coating layer has a thickness of 1.8-2.2 mm;

wherein the second coating layer is made of silica particles having a particle size of 0.8 mm;

wherein the particle size of the pressure-bearing plugging agent is within a range of 2.9-3.75 mm.

The present disclosure will be described in detail below with reference to examples.

In the following examples and comparative examples:

The highly water-absorbent resin sodium polyacrylate AP is purchased from Hebei Yanxing Chemical Co., Ltd;

The fully refined paraffin is commercially available from Fushun Petrochemical Branch Company of the PetroChina Company Limited.;

The rigid particle superfine ceramic powder is purchased from Donghai County Fucai Mineral Products Co., Ltd.;

The adhesive modified emulsified resin is produced by Beijing Gao Meng New Materials Co., Ltd.

Plugging material experimental apparatus QD-2, cartridge capacity: 4,000 mL, gas source: nitrogen gas, working pressure: (1,000±10) psi, gap plate specification: numbers 1-6 (wherein number 6 refers to a full diameter ring), the measured plugging depth: 0-77 mm, external dimensions: 40 cm×40 cm×105 cm, weight: 90 kg, purchased from Qingdao Hengtaida Electromechanical Equipment Co., Ltd.

Example 1

The example served to illustrate the pressure-bearing plugging agent prepared in the present disclosure.

(1) the highly water-absorbent resin sodium polyacrylate AP was subjected to a crushing process by a crusher and a spheroidization process to prepare spheres, the spheres were then sieved with a sieve to obtain a core with a diameter of 0.8 mm;

(2) the melted fully-refined granular paraffin liquid was poured on the whole outer surface of the spherical core obtained in the step (1) at the temperature of 62° C.;

(3) the silica particles and an adhesive modified emulsified resin were blended, the mixture was adhered to the surface of the product obtained in the step (2), the product was subjected to baking and sieving to obtain the pressure-bearing plugging agent with a diameter of 2.9 mm, specifically, the mixed powder consisting of the silica particles having a particle size of 0.8 mm and the adhesive modified emulsified resin was uniformly scattered on a tray, the spherical product obtained in the step (2) was then placed on the tray and the spherical product was subjected to rolling, such that the mixed powder was adhered to the surface of the spherical product, the spherical product was subsequently baked in a baking oven at 40° C. for 6 h, the spherical product was taken out and sieved to obtain particles with a particle size of 2.9 mm, thus the pressure-bearing plugging agent A1 with the improved stratum pressure-bearing capacity was prepared.

The prepared pressure-bearing plugging agent A1 was consisting of a core, a first coating layer and a second coating layer which were sequentially coated on an outer surface of the core; wherein the core was made of the highly water-absorbent resin sodium polyacrylate AP, the core had a diameter of 0.8 mm, the paraffin layer of the first coating layer had a thickness of 0.3 mm, and the second coating layer had a thickness of 1.8 mm;

wherein the second coating layer was made of silica particles having a particle size of 0.8 mm;

wherein the particle size of the pressure-bearing plugging agent was 2.9 mm.

Example 2

The example served to illustrate the pressure-bearing plugging agent prepared in the present disclosure.

(1) the highly water-absorbent resin sodium polyacrylate AP was subjected to a crushing process by a crusher and a spheroidization process to prepare spheres, the spheres were then sieved with a sieve to obtain a core with a diameter of 1.2 mm;

(2) the melted fully-refined granular paraffin liquid was poured on the whole outer surface of the spherical core obtained in the step (1) at the temperature of 62° C.;

(3) the silica particles and an adhesive modified emulsified resin were blended, the mixture was adhered to the surface of the product obtained in the step (2), the product was subjected to baking and sieving to obtain the pressure-bearing plugging agent with a diameter of 3.7 mm, specifically, the mixed powder consisting of the silica particles having a particle size of 1.2 mm and the adhesive modified emulsified resin was uniformly scattered on a tray, the spherical product obtained in the step (2) was then placed on the tray and the spherical product was subjected to rolling, such that the mixed powder was adhered to the surface of the spherical product, the spherical product was subsequently baked in a baking oven at 41° C. for 6.5 h, the spherical product was taken out and sieved to obtain particles with a particle size of 3.7 mm, thus the pressure-bearing plugging agent A2 with the improved stratum pressure-bearing capacity was prepared.

The prepared pressure-bearing plugging agent A2 was consisting of a core, a first coating layer and a second coating layer which were sequentially coated on an outer surface of the core; wherein the core was made of the highly water-absorbent resin sodium polyacrylate AP, the core had a diameter of 1.2 mm, the paraffin layer of the first coating layer had a thickness of 0.35 mm, and the second coating layer had a thickness of 2.2 mm;

wherein the second coating layer was made of silica particles having a particle size of 1.2 mm;

wherein the particle size of the pressure-bearing plugging agent was 3.75 mm.

Example 3

The example served to illustrate the pressure-bearing plugging agent prepared in the present disclosure.

(1) the highly water-absorbent resin sodium polyacrylate AP was subjected to a crushing process by a crusher and a spheroidization process to prepare spheres, the spheres were then sieved with a sieve to obtain a core with a diameter of 1.6 mm;

(2) the melted fully-refined granular paraffin liquid was poured on the whole outer surface of the spherical core obtained in the step (1) at the temperature of 62° C.;

(3) the silica particles and an adhesive modified emulsified resin were blended, the mixture was adhered to the surface of the product obtained in the step (2), the product was subjected to baking and sieving to obtain the pressure-bearing plugging agent with a diameter of 4.5 mm, specifically, the mixed powder consisting of the silica particles having a particle size of 1.5 mm and the adhesive modified emulsified resin was uniformly scattered on a tray, the spherical product obtained in the step (2) was then placed on the tray and the spherical product was subjected to rolling, such that the mixed powder was adhered to the surface of the spherical product, the spherical product was subsequently baked in a baking oven at 43° C. for 7.0 h, the spherical product was taken out and sieved to obtain particles with a particle size of 4.5 mm, thus the pressure-bearing plugging agent A3 with the improved stratum pressure-bearing capacity was prepared.

The prepared pressure-bearing plugging agent A3 was consisting of a core, a first coating layer and a second coating layer which were sequentially coated on an outer surface of the core; wherein the core was made of the highly water-absorbent resin sodium polyacrylate AP, the core had a diameter of 1.6 mm, the paraffin layer of the first coating layer had a thickness of 0.4 mm, and the second coating layer had a thickness of 2.5 mm;

Wherein the second coating layer was made of silica particles having a particle size of 1.5 mm;

Wherein the particle size of the pressure-bearing plugging agent was 4.5 mm.

Example 4

The example served to illustrate the pressure-bearing plugging agent prepared in the present disclosure.

(1) the highly water-absorbent resin sodium polyacrylate AP was subjected to a crushing process by a crusher and a spheroidization process to prepare spheres, the spheres were then sieved with a sieve to obtain a core with a diameter of 2.0 mm;

(2) the melted fully-refined granular paraffin liquid was poured on the whole outer surface of the spherical core obtained in the step (1) at the temperature of 62° C.;

(3) the silica particles and an adhesive modified emulsified resin were blended, the mixture was adhered to the surface of the product obtained in the step (2), the product was subjected to baking and sieving to obtain the pressure-bearing plugging agent with a diameter of 5.3 mm, specifically, the mixed powder consisting of the silica particles having a particle size of 1.85 mm and the adhesive modified emulsified resin was uniformly scattered on a tray, the spherical product obtained in the step (2) was then placed on the tray and the spherical product was subjected to rolling, such that the mixed powder was adhered to the surface of the spherical product, the spherical product was subsequently baked in a baking oven at 44° C. for 7.5 h, the spherical product was taken out and sieved to obtain particles with a particle size of 5.3 mm, thus the pressure-bearing plugging agent A4 with the improved stratum pressure-bearing capacity was prepared.

The prepared pressure-bearing plugging agent A4 was consisting of a core, a first coating layer and a second coating layer which were sequentially coated on an outer surface of the core; wherein the core was made of the highly water-absorbent resin sodium polyacrylate AP, the core had a diameter of 2.0 mm, the paraffin layer of the first coating layer had a thickness of 0.45 mm, and the second coating layer had a thickness of 2.85 mm;

Wherein the second coating layer was made of silica particles having a particle size of 1.85 mm;

Wherein the particle size of the pressure-bearing plugging agent was 5.3 mm.

Example 5

The example served to illustrate the pressure-bearing plugging agent prepared in the present disclosure.

(1) the highly water-absorbent resin sodium polyacrylate AP was subjected to a crushing process by a crusher and a spheroidization process to prepare spheres, the spheres were then sieved with a sieve to obtain a core with a diameter of 2.3 mm;

(2) the melted fully-refined granular paraffin liquid was poured on the whole outer surface of the spherical core obtained in the step (1) at the temperature of 62° C.;

(3) the silica particles and an adhesive modified emulsified resin were blended, the mixture was adhered to the surface of the product obtained in the step (2), the product was subjected to baking and sieving to obtain the pressure-bearing plugging agent with a diameter of 6.0 mm, specifically, the mixed powder consisting of the silica particles having a particle size of 2.2 mm and the adhesive modified emulsified resin was uniformly scattered on a tray, the spherical product obtained in the step (2) was then placed on the tray and the spherical product was subjected to rolling, such that the mixed powder was adhered to the surface of the spherical product, the spherical product was subsequently baked in a baking oven at 45° C. for 8.0 h, the spherical product was taken out and sieved to obtain particles with a particle size of 6.0 mm, thus the pressure-bearing plugging agent A5 with the improved stratum pressure-bearing capacity was prepared.

The prepared pressure-bearing plugging agent A5 was consisting of a core, a first coating layer and a second coating layer which were sequentially coated on an outer surface of the core; wherein the core was made of the highly water-absorbent resin sodium polyacrylate AP, the core had a diameter of 2.3 mm, the paraffin layer of the first coating layer had a thickness of 0.5 mm, and the second coating layer had a thickness of 3.2 mm;

Wherein the second coating layer was made of silica particles having a particle size of 2.2 mm;

Wherein the particle size of the pressure-bearing plugging agent was 6.0 mm.

Comparative Example 1

The pressure-bearing plugging agent was prepared with the same method as in Example 1, except that in the step (3), "the spherical product was taken out and sieved to obtain particles with a particle size of 2.9 mm" was replaced by "the spherical product was taken out and sieved to obtain particles with a particle size of 15 mm".

The pressure-bearing plugging agent D1 was prepared, wherein the pressure-bearing plugging agent D1 was consisting of a core, a first coating layer and a second coating layer which were sequentially coated on an outer surface of the core; wherein the core was made of the highly water-absorbent resin sodium polyacrylate AP, the core had a diameter of 1.0 mm, the paraffin layer of the first coating layer had a thickness of 1.0 mm, and the second coating layer had a thickness of 7.0 mm;

wherein the second coating layer was made of silica particles having a particle size of 6.0 mm;

wherein the particle size of the pressure-bearing plugging agent was 15 mm.

Comparative Example 2

The pressure-bearing plugging agent was prepared with the same method as in Example 1, except that the step (2) was omitted, that is, there was not a paraffin layer between the second coating layer and the core; the diameter of the core was 0.8 mm, the thickness of the second coating layer was 1.8 mm, and the particle size of the plugging agent was 2.6 mm.

The plugging agent D2 was prepared.

Comparative Example 3

The pressure-bearing plugging agent was prepared with the same method as in Example 1, except that in the step (3), "the silica particles having a particle size of 0.8 mm" was replaced by "the silica particles having a particle size of 0.1 mm".

The plugging agent D3 was prepared, wherein the plugging agent D3 was consisting of a core, a first coating layer and a second coating layer which were sequentially coated on an outer surface of the core; wherein the core was made of the highly water-absorbent resin sodium polyacrylate AP, the core had a diameter of 0.8 mm, the paraffin layer of the first coating layer had a thickness of 0.3 mm, and the second coating layer had a thickness of 1.1 mm;

wherein the second coating layer was made of silica particles having a particle size of 0.1 mm;

wherein the particle size of the pressure-bearing plugging agent was 2.2 mm.

Comparative Example 4

The pressure-bearing plugging agent was prepared with the same method as in Example 1, except that in the step (3), "the spherical product was subsequently baked in a baking oven at 40° C. for 6 h" was replaced by "the spherical product was subsequently baked in a baking oven at 100° C. for 1 h".

The plugging agent D4 was prepared, wherein the plugging agent D4 was consisting of a core, a first coating layer and a second coating layer which were sequentially coated on an outer surface of the core; wherein the core was made of the highly water-absorbent resin sodium polyacrylate AP, the core had a diameter of 0.8 mm, the paraffin layer of the first coating layer had a thickness of 0.1 mm, and the second coating layer had a thickness of 1.8 mm;

wherein the second coating layer was made of silica particles having a particle size of 0.8 mm;

wherein the particle size of the pressure-bearing plugging agent was 2.7 mm.

Comparative Example 5

The pressure-bearing plugging agent was prepared with the same method as in Example 1, except that in the step (3), the baking process was not carried out in an oven at 40° C. for 6 h, but a natural drying and adhering mode was adopted.

The plugging agent D5 was prepared, wherein the plugging agent D5 was consisting of a core, a first coating layer and a second coating layer which were sequentially coated on an outer surface of the core; wherein the core was made of the highly water-absorbent resin sodium polyacrylate AP, the core had a diameter of 0.8 mm, the paraffin layer of the first coating layer had a thickness of 0.7 mm, and the second coating layer had a thickness of 1.8 mm;

wherein the second coating layer was made of silica particles having a particle size of 0.8 mm;

wherein the particle size of the pressure-bearing plugging agent was 3.3 mm.

Test Example

The plugging material experimental apparatus QD-2 was used and subjected to modification:

The pellets underneath the plugging material experimental apparatus QD-2 were removed, a stainless steel cylindrical seam plate was added, wherein the thickness of the cylindrical seam plate was 6 cm, a wedge-shaped seam with a length of 5 cm, a width of 1cm and a depth of 6 cm was formed on the cylindrical seam plate, the internal part of the wedge-shaped seam was roughened by grinding to simulate a stratum crack, a heating sleeve was arranged outside the cylindrical seam plate for heating, and the temperature was raised to 120° C. prior to injection of the plugging slurry.

The experimental method comprised the following steps:

(1-1) Several cups of soil slurry (100 mL of clear water and 4 g of bentonite) were prepared, the cups of soil slurry were respectively added with the plugging agents of the above examples and comparative examples into to obtain the plugging slurries;

(1-2) the plugging slurries prepared in the step (1-1) were added into the experimental instrument, the leakage conditions of the plugging slurries were observed, and the leakage conditions such as the starting leaking time and the leakage amount of the drilling fluid were recorded;

(1-3) when there was not liquid flowing from the small opening in the lower part, it can be deemed that the crack had been plugged;

(1-4) the experimental instrument in the step (1-3) was pressurized with a nitrogen gas cylinder and the time was recorded. The pressure was increased from normal pressure to 0.5 MPa, the leakage condition was observed, if the leakage did not occur, the pressure was further increased to 1 MPa after 2 minutes, the leakage condition was observed, if the leakage did not occur, the pressurization process was continuously performed, and repeating the steps to increase the pressure to 6.0 MPa. If the leakage of the drilling fluid occurred during the pressurizing process, the leakage conditions were observed and recorded, until the leakage of the drilling fluid was stopped, the pressure was stabilized for 2 min, and the pressurization process was continuously implemented with a pressure rise amplitude of 0.5 MPa for each time until the pressure was increased to 6.0 MPa. The above stage was the plugging stage, if the drilling fluid was completely leaked during the pressurizing process, such a condition was denoted as breakdown under pressure, in the meanwhile, the leakage condition and the pressure when the breakdown occurred were recorded.

(1-5) Relieving pressure, the cylindrical seam plate was taken out, the seam surface of the crack and the condition in the crack were observed and recorded;

(1-6) the surface of the cylindrical seam plate which was not pressed through in the step (1-5) was cleaned, the cylindrical seam plate was placed into an experimental instrument, the drilling fluid (a conventional sulfonated drilling fluid system) with the same volume as the plugging slurry in the step (1) was poured, and subjecting to pressurizing by using a nitrogen gas bottle to 6.0 MPa at a pressure rise rate of 0.5 MPa/2 min, the stage was a pressure-bearing stage, the leakage condition and the pressure when the breakdown occurred were observed and recorded.

(1-7) The instrument was subjected to cleaning, the data was disposed, an experimental result was analyzed and the experiment was finished.

The leakage stoppage effect and the pressure-bearing effect of the plugging slurry of each example and comparative example were tested according to the aforementioned experimental method, and the experimental data were shown in the leakage stoppage effect and the pressure-bearing effect of the plugging slurries in the Table 1.

TABLE 1

| Experimental groups | Leaking stoppage stage | | Pressure-bearing stage | |
|---|---|---|---|---|
| | Breakdown pressure/MPa | Leakage amount/mL | Breakdown pressure/MPa | Leakage amount/mL |
| A1 | — | 10 | — | 0 |
| A2 | — | 13 | — | 0 |
| A3 | — | 14 | — | 0 |
| A4 | — | 15 | — | 0 |
| A5 | — | 16 | — | 0 |
| D1 | — | 16 | 1.5 | Leaked completely |
| D2 | — | 14 | 2.5 | Leaked completely |
| D3 | — | 15 | 2.0 | Leaked completely |
| D4 | — | 18 | 4.0 | Leaked completely |
| D5 | — | 17 | 3.0 | Leaked completely |

Note: "-" refers to that the sample is not broken down, which shows that the plugging filling layer formed by the pressure-bearing plugging slurry in a leaking stoppage stage has a high strength, the pressure-bearing capacity of a stratum is effectively improved, and the pressure-bearing and leaking stoppage effects are excellent.

The data in the Table 1 shows that the experiment relates to evaluation based on a single reagent, namely "soil slurry+ plugging agent", there is not synergistic effect of various plugging materials, so that the leakage amount of each of the plugging agents in the plugging stage is relatively large, and the plugging agents A1-A5 demonstrate that the plugging agents for improving pressure-bearing capacity of the stratum can effectively perform plugging even if it is used alone, in addition, the plugging layer formed in the crack has a high strength, the three groups of experiment groups in the pressure-bearing stage do not suffer from the breakdown circumstance, it indicates that the plugging layer formed in the crack can effectively improve pressure-bearing capacity of the stratum.

In addition, although the difference between the examples and the comparative examples is not obvious in the plugging stage, the borehole plugging is a process, it not only requires a successful plugging in the early stage, but also requires that the plugging layer can bear pressure in the subsequent process, otherwise it is prone to cause a vicious circle of plugging and leakage after an increase of the density (or pressure rise). Therefore, the plugging process and the pressure-bearing process shall be comprehensively evaluated, the effect of the examples is superior to that of the comparative examples.

With regard to the plugging agent D1, the plugging process can be successfully completed, however, because the outer shell has an excessively large diameter, the plugging agent only forms a plugging layer on a surface of the crack, the interior part of the crack is not filled, such that the plug layer is broken down during the pressure-bearing stage.

With regard to the plugging agent D2, because of an absence of the paraffin layer, when the plugging agent reaches the internal space of the crack, a gap does not exist between the outer shell and the core, so that the outer shell does not easily disintegrate, namely, the plugging agent only plays the role of the ordinary rigid particles in the internal space of the crack, and can successfully plug the crack; while in the pressure-bearing stage, given that the internal space of the crack has a gap, that is, the internal space of the crack is not completely filled, the formed plugging layer does not have a strong structure, thus the plugging layer is prone to be broken down. In regard to the plugging agent D3, since the particle diameter of the silica particles applied as the outer shell material is too small, the strength of the outer shell is excessively high, the outer shell cannot be easily disintegrated in the crack, causing a similar situation as the plugging agent D2.

In regard to the plugging agent D4, due to the fact that the baking temperature is too high, the paraffin layer melts early, the outer shell of the plugging agent is disintegrated before entering the crack, the core begins to absorb water and swell, a filling layer is formed on the surface of the crack, the inner part of the crack is not filled, the filling layer on the surface of the crack is prone to break down in the pressure-bearing stage.

In regard to the plugging agent D5, the outer shell was naturally dried and adhered, its strength is not high, thus the outer shell is prone to disintegrate before entering into the cracks, which resulted in the occurrence of same circumstance as that of the plugging agent D4.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A pressure-bearing plugging agent comprising a core, a first coating layer and a second coating layer which are sequentially coated on an outer surface of the core, wherein the core is made of a water-absorbing swellable material, the first coating layer is a paraffin layer, and the second coating layer is obtained by cementing the rigid particles with an adhesives;
wherein the rigid particles are silica.

2. The pressure-bearing plugging agent of claim 1, wherein the core has a particle size within a range of 0.5-6 mm, the first coating layer has a thickness of 0.1-0.8 mm, the second coating layer has a thickness of 1.5-6 mm.

3. The pressure-bearing plugging agent of claim 1, wherein the core has a particle size within a range of 0.8-2.3 mm, the paraffin layer has a thickness of 0.3-0.5 mm, the coating layer has a thickness of 1.8-3.2 mm.

4. The pressure-bearing plugging agent of claim 1, wherein the pressure-bearing plugging agent has a particle size within a range of 2.1-12.8 mm.

5. The pressure-bearing plugging agent of claim 4, wherein the pressure-bearing plugging agent has a particle size within a range of 2.9-6 mm.

6. The pressure-bearing plugging agent of claim 1, wherein the water-absorbing swellable material is a resin.

7. The pressure-bearing plugging agent of claim 6, wherein the water-absorbing swellable material is sodium polyacrylate.

8. The pressure-bearing plugging agent of claim 1, wherein the rigid particles have a particle size within a range of 0.5-5 mm.

9. The pressure-bearing plugging agent of claim 1, wherein the adhesive is one or more selected from the group consisting of modified emulsified resin, polyurethane and epoxy resin.

10. The pressure-bearing plugging agent of claim 9, wherein the adhesive is a modified emulsified resin.

11. A method for preparing the pressure-bearing plugging agent of claim 1, wherein the method includes:
    (1) subjecting the water-absorbing material to a spheroidization process to obtain a core;
    (2) coating at least a part of an outer surface of the core with paraffin to obtain a paraffin layer;
    (3) adhering the adhesive and mixed powder to at least a part of an outer surface of the paraffin layer and subjecting to the baking treatment, so as to obtain the modified bridging material, wherein the adhesive and mixed powder comprises rigid particles and an adhesive.

12. The method of claim 11, wherein the conditions of the baking treatment in step (3) comprise: a temperature within a range of 30-50° C., and a time of 4-10 h.

* * * * *